United States Patent
He et al.

(10) Patent No.: US 12,389,255 B2
(45) Date of Patent: Aug. 12, 2025

(54) TECHNIQUES FOR CONFIGURING A MAC-CE BITMAP FOR BEAM FAILURE RECOVERY

(71) Applicant: QUALCOMM Incorporated, San Diego, CA (US)

(72) Inventors: Linhai He, San Diego, CA (US); Ruiming Zheng, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 316 days.

(21) Appl. No.: 17/758,501

(22) PCT Filed: Feb. 28, 2020

(86) PCT No.: PCT/CN2020/077144
§ 371 (c)(1),
(2) Date: Jul. 7, 2022

(87) PCT Pub. No.: WO2021/168779
PCT Pub. Date: Sep. 2, 2021

(65) Prior Publication Data
US 2023/0021967 A1  Jan. 26, 2023

(51) Int. Cl.
*H04W 24/10* (2009.01)
*H04B 7/06* (2006.01)

(52) U.S. Cl.
CPC .......... *H04W 24/10* (2013.01); *H04B 7/0695* (2013.01)

(58) Field of Classification Search
CPC .............................. H04W 24/10; H04B 7/0695
See application file for complete search history.

(56) References Cited

U.S. PATENT DOCUMENTS

| 2015/0296522 A1* | 10/2015 | Bergström ........... H04B 7/0626 370/329 |
| 2019/0215136 A1 | 7/2019 | Zhou et al. |

(Continued)

FOREIGN PATENT DOCUMENTS

| CN | 110022613 A | 7/2019 |
| CN | 110034799 A | 7/2019 |

(Continued)

OTHER PUBLICATIONS

Samsung: "Remaining Issues of SCell BFR", 3GPP TSG-RAN WG2 Meeting#109, R2-2000226, 3rd Generation Partnership Project, Mobile Competence Centre, 650, Route Des Lucioles, F-06921 Sophia-Antipolis Cedex, France, vol. RAN WG2, No. Athens, Greece, Feb. 24, 2020-Feb. 28, 2020, Feb. 13, 2020, 3 Pages, XP052355409, Section 2.3, Figures 1A, 1B.

(Continued)

*Primary Examiner* — Derrick V Rose
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may configure a bitmap in a medium access control control element (MAC-CE) to indicate beam failure information for one or more serving cells or one or more groups of serving cells. The UE may transmit the MAC-CE to a base station via at least one serving cell. Numerous other aspects are provided.

34 Claims, 10 Drawing Sheets

(56) References Cited

U.S. PATENT DOCUMENTS

| | | |
|---|---|---|
| 2019/0349059 A1 | 11/2019 | John Wilson et al. |
| 2020/0267797 A1* | 8/2020 | Wei ........................ H04W 72/21 |
| 2020/0383167 A1* | 12/2020 | Sengupta ............... H04W 76/19 |
| 2021/0013949 A1* | 1/2021 | Agiwal ............... H04W 72/046 |
| 2022/0052749 A1* | 2/2022 | Guo ....................... H04W 76/19 |
| 2022/0061087 A1* | 2/2022 | Koskela ............ H04W 72/1268 |
| 2022/0210683 A1 | 6/2022 | Li |
| 2022/0217588 A1* | 7/2022 | You ....................... H04W 76/19 |

FOREIGN PATENT DOCUMENTS

| | | |
|---|---|---|
| CN | 110226340 A | 9/2019 |
| CN | 110662252 A | 1/2020 |
| EP | 3528398 A1 | 8/2019 |
| EP | 3609285 A1 | 2/2020 |

OTHER PUBLICATIONS

Supplementary European Search Report—EP20922266—Search Authority—Munich—Oct. 19, 2023.
International Search Report and Written Opinion—PCT/CN2020/077144—ISA/EPO—Apr. 30, 2020.
Samsung: "Remaining Issues of SCell BFR", 3GPP TSG-RAN WG2 Meeting#109, R2-2000226, Athens, Greece, Feb. 24-28, 2020, Feb. 13, 2020, 3 Pages.

* cited by examiner

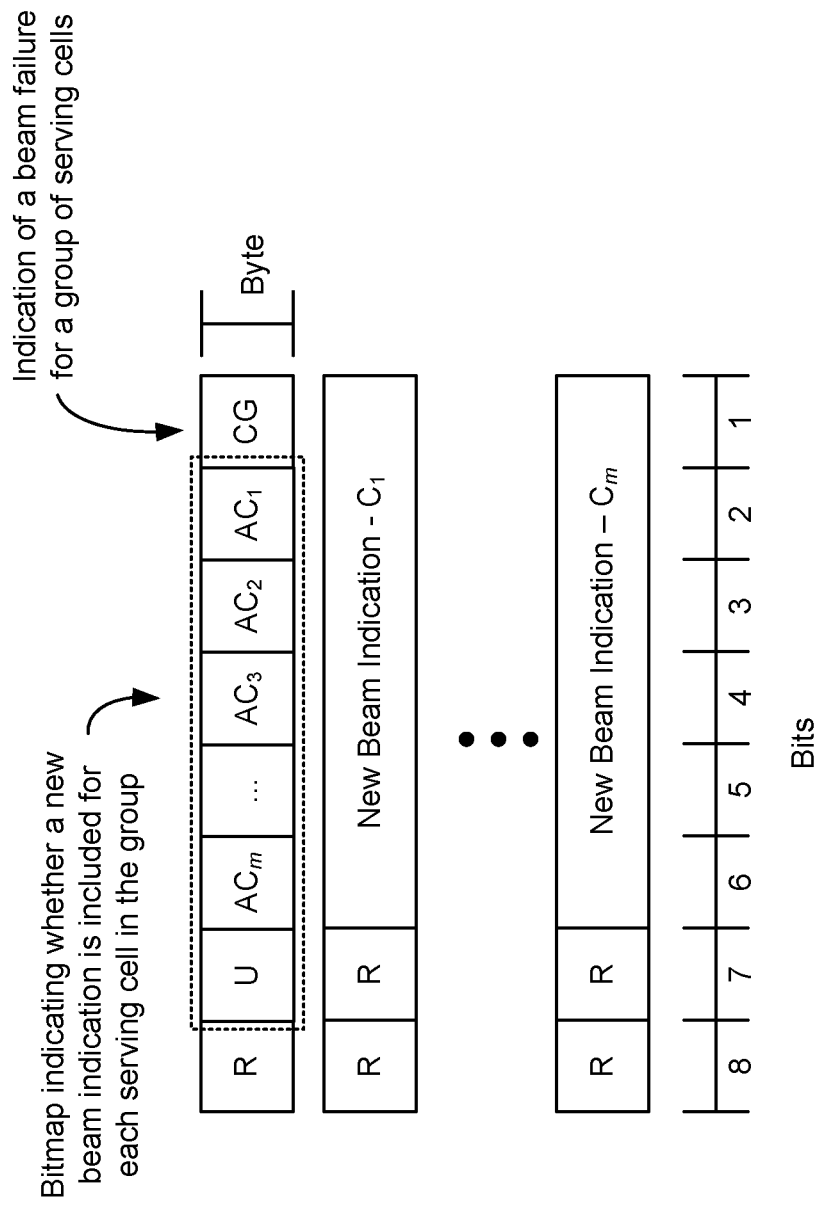

TECHNIQUES FOR CONFIGURING A MAC-CE BITMAP FOR BEAM FAILURE RECOVERY

CROSS-REFERENCE TO RELATED APPLICATION

This application is a 371 national stage of Patent Cooperation Treaty (PCT) Application No. PCT/CN2020/077144 filed on Feb. 28, 2020, entitled "TECHNIQUES FOR CONFIGURING A MAC-CE BITMAP FOR BEAM FAILURE," which is hereby expressly incorporated by reference herein.

FIELD OF THE DISCLOSURE

Aspects of the present disclosure generally relate to wireless communication and to techniques for configuring a medium access control control element (MAC-CE) bitmap for beam failure recovery.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include configuring a bitmap in a medium access control control element (MAC-CE) to indicate beam failure information for one or more serving cells or one or more groups of serving cells; and transmitting the MAC-CE to a base station via at least one serving cell.

In a first aspect, configuring the bitmap comprises configuring each bit, of at least a subset of bits included in the bitmap, to indicate whether a beam failure of one or more beams has occurred for an associated serving cell of the one or more serving cells, wherein the one or more serving cells are configured with beam failure detection capabilities. In a second aspect, alone or in combination with the first aspect, another subset of the bitmap includes one or more unused bits. In a third aspect, alone or in combination with one or more of the first and second aspects, the bitmap is included along with one or more reserved bits in a byte in the MAC-CE. In a fourth aspect, alone or in combination with one or more of the first through third aspects, the method further comprises configuring, in the MAC-CE, one or more bytes associated with the one or more serving cells, wherein a byte, of the one or more bytes, is associated with a serving cell of the one or more serving cells includes a first field is indicating whether the byte includes an indication of a new beam for the serving cell and a second field is including the indication of the new beam.

In a fifth aspect, alone or in combination with one or more of the first through fourth aspects, configuring the bitmap comprises configuring each bit, of at least a subset of bits included in the bitmap, to indicate whether a beam failure of one or more beams has occurred for at least a subset of the one or more groups of serving cells, wherein serving cells within each group are quasi-co-located. In a sixth aspect, alone or in combination with one or more of the first through fifth aspects, another subset of the bitmap includes one or more unused bits. In a seventh aspect, alone or in combination with one or more of the first through sixth aspects, the bitmap is included along with one or more reserved bits in a byte in the MAC-CE. In an eighth aspect, alone or in combination with one or more of the first through seventh aspects, the bitmap is included along with one or more new beam indicator bits in a byte in the MAC-CE, and each of the one or more new beam indicator bits indicates whether an associated byte in the MAC-CE includes an indication of a new beam for an associated group of serving cells.

In a ninth aspect, alone or in combination with one or more of the first through eighth aspects, the configuring the bitmap comprises configuring each bit, of at least a subset of bits included in the bitmap, to indicate that a beam failure of one or more beams has occurred for a respective serving cell of a group of serving cells of the one or more groups of serving cells. In a tenth aspect, alone or in combination with one or more of the first through ninth aspects, the method further comprises configuring each of one or more bytes in the MAC-CE to indicate a same new beam for an associated serving cell of the group of serving cells. In an eleventh aspect, alone or in combination with one or more of the first through tenth aspects, the bitmap is included in a byte with one or more other bits that indicate the beam failure for a group of serving cells of the one or more groups of serving cells, and each bit in the bitmap indicates whether a new beam is indicated for an associated serving cell in the group of serving cells.

In some aspects, a UE for wireless communication may include a memory and one or more processors operatively coupled to the memory. The memory and the one or more processors may be configured to configure a bitmap in a MAC-CE to indicate beam failure information for one or more serving cells or one or more groups of serving cells; and transmit the MAC-CE to to a base station via at least one serving cell.

In a first aspect, the one or more processors, when configuring the bitmap, are configured to configure each bit, of at least a subset of bits included in the bitmap, to indicate whether a beam failure of one or more beams has occurred for an associated serving cell of the one or more serving cells, wherein the one or more serving cells are configured with beam failure detection capabilities. In a second aspect, alone or in combination with the first aspect, another subset of the bitmap includes one or more unused bits. In a third aspect, alone or in combination with one or more of the first and second aspects, the bitmap is included along with one or more reserved bits in a byte in the MAC-CE. In a fourth aspect, alone or in combination with one or more of the first through third aspects, the one or more processors are further configured to configure, in the MAC-CE, one or more bytes associated with the one or more serving cells, wherein a byte, of the one or more bytes, is associated with a serving cell of the one or more serving cells includes a first field is indicating whether the byte includes an indication of a new beam for the serving cell and a second field is including the indication of the new beam.

In a fifth aspect, alone or in combination with one or more of the first through fourth aspects, the one or more processors, when configuring the bitmap, are configured to configure each bit, of at least a subset of bits included in the bitmap, to indicate whether a beam failure of one or more beams has occurred for at least a subset of the one or more groups of serving cells, wherein serving cells within each group are quasi-co-located. In a sixth aspect, alone or in combination with one or more of the first through fifth aspects, another subset of the bitmap includes one or more unused bits. In a seventh aspect, alone or in combination with one or more of the first through sixth aspects, the bitmap is included along with one or more reserved bits in a byte in the MAC-CE. In an eighth aspect, alone or in combination with one or more of the first through seventh aspects, the bitmap is included along with one or more new beam indicator bits in a byte in the MAC-CE, and each of the one or more new beam indicator bits indicates whether an associated byte in the MAC-CE includes an indication of a new beam for an associated group of serving cells.

In a ninth aspect, alone or in combination with one or more of the first through eighth aspects, the one or more processors, when configuring the bitmap, are configured to configure each bit, of at least a subset of bits included in the bitmap, to indicate that a beam failure of one or more beams has occurred for a respective serving cell of a group of serving cells of the one or more groups of serving cells. In a tenth aspect, alone or in combination with one or more of the first through ninth aspects, the one or more processors are further configured to configure each of one or more bytes in the MAC-CE to indicate a same new beam for an associated serving cell of the group of serving cells. In an eleventh aspect, alone or in combination with one or more of the first through tenth aspects, the bitmap is included in a byte with one or more other bits that indicate the beam failure for a group of serving cells of the one or more groups of serving cells, and each bit in the bitmap indicates whether a new beam is indicated for an associated serving cell in the group of serving cells.

In some aspects, a non-transitory computer-readable medium may store one or more instructions for wireless communication. The one or more instructions, when executed by one or more processors of a UE, may cause the one or more processors to configure a bitmap in a MAC-CE to indicate beam failure information for one or more serving cells or one or more groups of serving cells; and transmit the MAC-CE to a base station via at least one serving cell.

In a first aspect, the one or more instructions, that cause the one or more processors to configure the bitmap, cause the one or more processors to configure each bit, of at least a subset of bits included in the bitmap, to indicate whether a beam failure of one or more beams has occurred for an associated serving cell of the one or more serving cells, wherein the one or more serving cells are configured with beam failure detection capabilities. In a second aspect, alone or in combination with the first aspect, another subset of the bitmap includes one or more unused bits. In a third aspect, alone or in combination with one or more of the first and second aspects, the bitmap is included along with one or more reserved bits in a byte in the MAC-CE. In a fourth aspect, alone or in combination with one or more of the first through third aspects, the one or more instructions, when executed by the one or more processors, further cause the one or more processors to configure, in the MAC-CE, one or more bytes associated with the one or more serving cells, wherein a byte, of the one or more bytes, is associated with a serving cell of the one or more serving cells includes a first field is indicating whether the byte includes an indication of a new beam for the serving cell and a second field is including the indication of the new beam.

In a fifth aspect, alone or in combination with one or more of the first through fourth aspects, the one or more instructions, that cause the one or more processors to configure the bitmap, cause the one or more processors to configure each bit, of at least a subset of bits included in the bitmap, to indicate whether a beam failure of one or more beams has occurred for at least a subset of the one or more groups of serving cells, wherein serving cells within each group are quasi-co-located. In a sixth aspect, alone or in combination with one or more of the first through fifth aspects, another subset of the bitmap includes one or more unused bits. In a seventh aspect, alone or in combination with one or more of the first through sixth aspects, the bitmap is included along with one or more reserved bits in a byte in the MAC-CE. In an eighth aspect, alone or in combination with one or more of the first through seventh aspects, the bitmap is included along with one or more new beam indicator bits in a byte in the MAC-CE, and each of the one or more new beam indicator bits indicates whether an associated byte in the MAC-CE includes an indication of a new beam for an associated group of serving cells.

In a ninth aspect, alone or in combination with one or more of the first through eighth aspects, the one or more instructions, that cause the one or more processors to configure the bitmap, cause the one or more processors to configure each bit, of at least a subset of bits included in the bitmap, to indicate that a beam failure of one or more beams has occurred for a respective serving cell of a group of serving cells of the one or more groups of serving cells. In a tenth aspect, alone or in combination with one or more of the first through ninth aspects, the one or more instructions, when executed by the one or more processors, further cause the one or more processors to configure each of one or more bytes in the MAC-CE to indicate a same new beam for an associated serving cell of the group of serving cells. In an eleventh aspect, alone or in combination with one or more of the first through tenth aspects, the bitmap is included in a byte with one or more other bits that indicate the beam failure for a group of serving cells of the one or more groups of serving cells, and each bit in the bitmap indicates whether a new beam is indicated for an associated serving cell in the group of serving cells.

In some aspects, an apparatus for wireless communication may include means for configuring a bitmap in a MAC-CE to indicate beam failure information for one or more serving cells or one or more groups of serving cells; and means for transmitting the MAC-CE to a base station via at least one serving cell.

In a first aspect, the means for configuring the bitmap comprises means for configuring each bit, of at least a subset of bits included in the bitmap, to indicate whether a beam failure of one or more beams has occurred for an associated serving cell of the one or more serving cells, wherein the one or more serving cells are configured with beam failure detection capabilities. In a second aspect, alone or in combination with the first aspect, another subset of the bitmap includes one or more unused bits. In a third aspect, alone or in combination with one or more of the first and second aspects, the bitmap is included along with one or more reserved bits in a byte in the MAC-CE. In a fourth aspect, alone or in combination with one or more of the first through third aspects, the apparatus further comprises means for configuring, in the MAC-CE, one or more bytes associated with the one or more serving cells, wherein a byte, of the one or more bytes, is associated with a serving cell of the one or more serving cells includes a first field is indicating whether the byte includes an indication of a new beam for the serving cell and a second field is including the indication of the new beam.

In a fifth aspect, alone or in combination with one or more of the first through fourth aspects, the means for configuring the bitmap comprises means for configuring each bit, of at least a subset of bits included in the bitmap, to indicate whether a beam failure of one or more beams has occurred for at least a subset of the one or more groups of serving cells, wherein serving cells within each group are quasi-co-located. In a sixth aspect, alone or in combination with one or more of the first through fifth aspects, another subset of the bitmap includes one or more unused bits. In a seventh aspect, alone or in combination with one or more of the first through sixth aspects, the bitmap is included along with one or more reserved bits in a byte in the MAC-CE. In an eighth aspect, alone or in combination with one or more of the first through seventh aspects, the bitmap is included along with one or more new beam indicator bits in a byte in the MAC-CE, and each of the one or more new beam indicator bits indicates whether an associated byte in the MAC-CE includes an indication of a new beam for an associated group of serving cells.

In a ninth aspect, alone or in combination with one or more of the first through eighth aspects, the means for configuring the bitmap comprises means for configuring each bit, of at least a subset of bits included in the bitmap, to indicate that a beam failure of one or more beams has occurred for a respective serving cell of a group of serving cells of the one or more groups of serving cells. In a tenth aspect, alone or in combination with one or more of the first through ninth aspects, the method further comprises configuring each of one or more bytes in the MAC-CE to indicate a same new beam for an associated serving cell of the group of serving cells. In an eleventh aspect, alone or in combination with one or more of the first through tenth aspects, the bitmap is included in a byte with one or more other bits that indicate the beam failure for a group of serving cells of the one or more groups of serving cells, and each bit in the bitmap indicates whether a new beam is indicated for an associated serving cell in the group of serving cells.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3 and 4A-4E are diagrams illustrating examples of configuring a medium access control control element (MAC-CE) bitmap for beam failure recovery, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
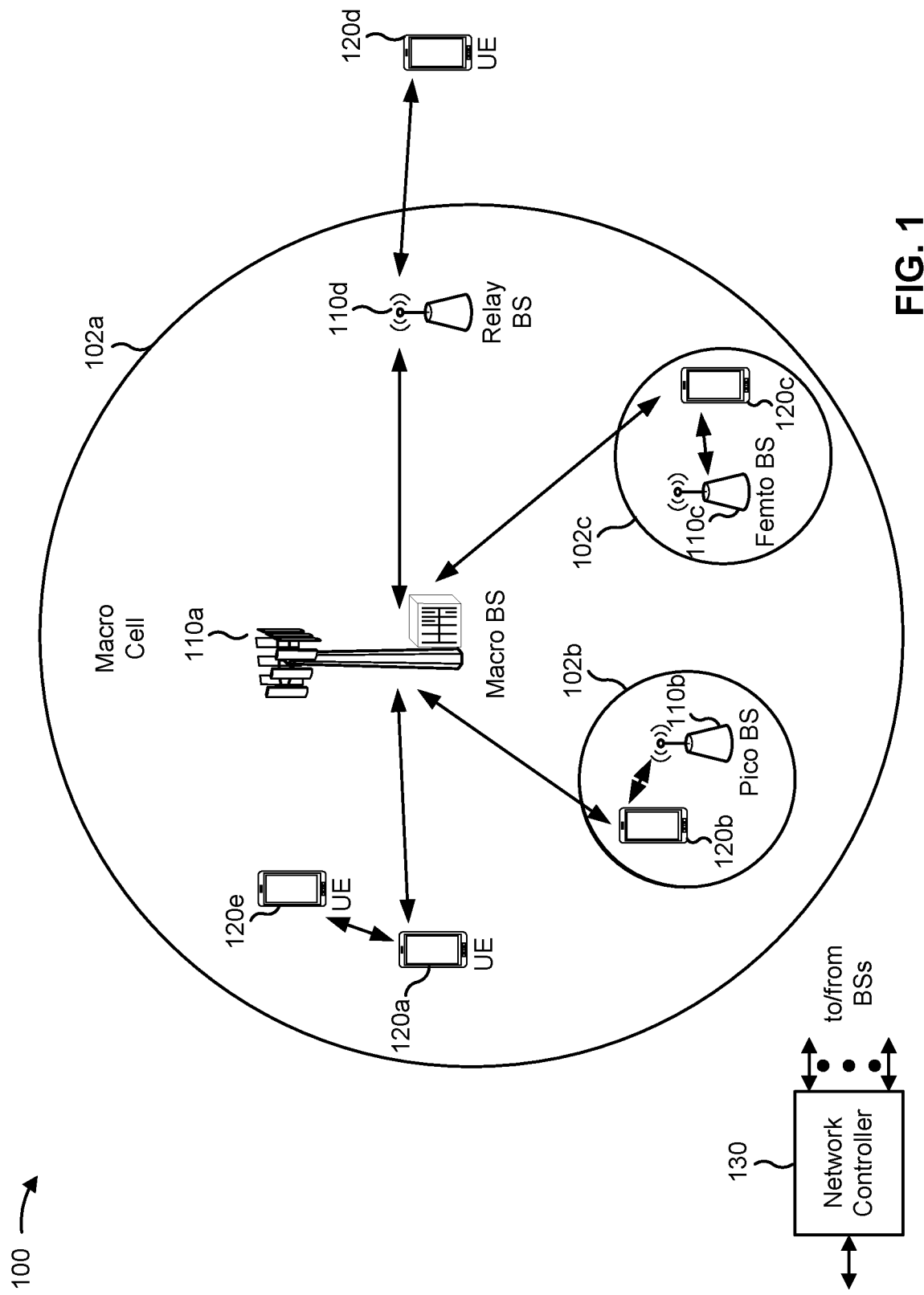
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
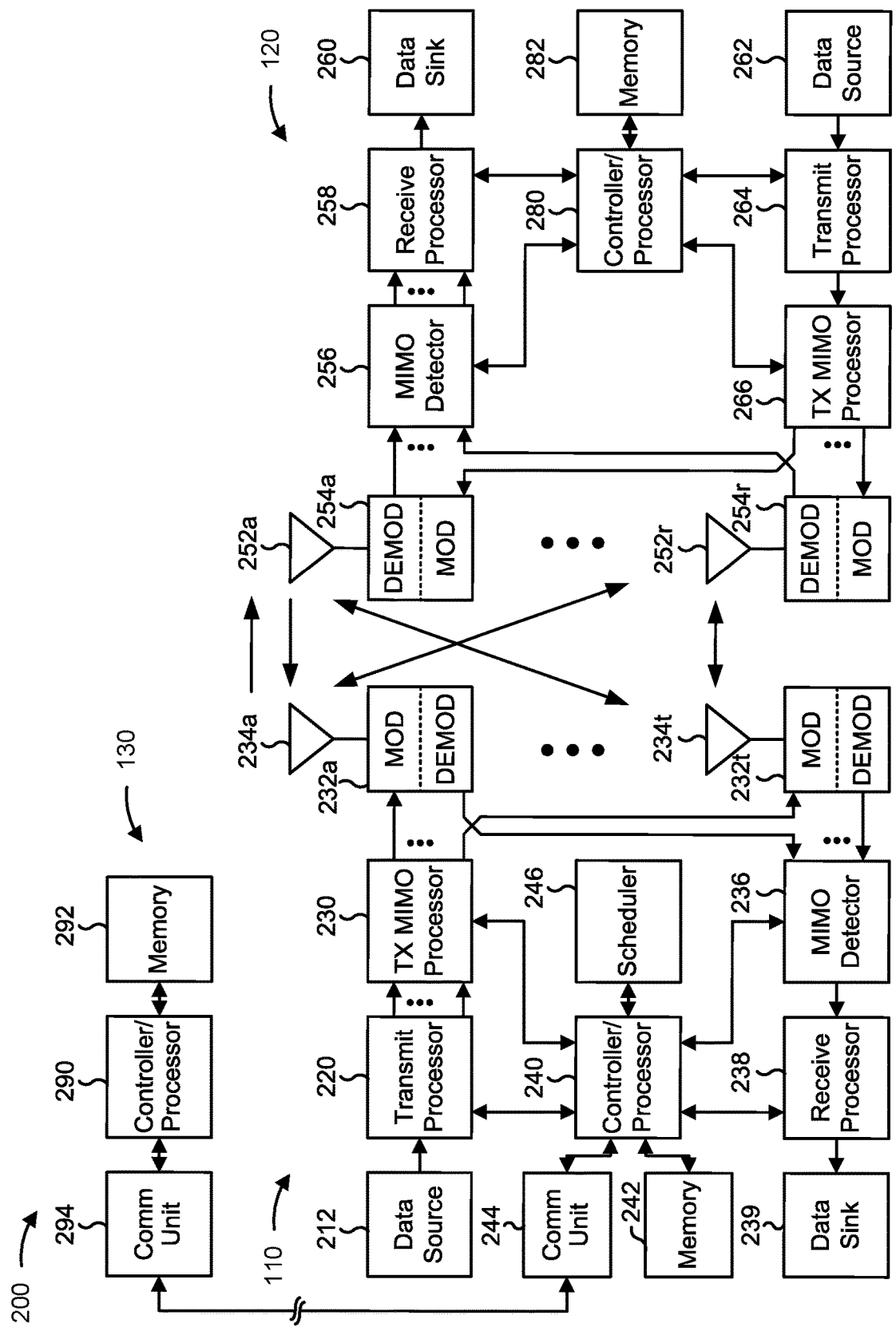
FIG. 2 is a diagram illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MC S(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with configuring a medium access control control element (MAC-CE) bitmap for beam failure recovery, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5 and/or other processes as described herein. A scheduler 246 may schedule UEs for data transmission on the downlink and/or uplink.

In some aspects, UE 120 may include means for configuring a bitmap in a MAC-CE to indicate beam failure information for one or more serving cells or one or more groups of serving cells, means for transmitting the MAC-CE to at least one of the one or more serving cells, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Beam failure recovery (BFR) and beam failure recovery requests (BFRQ) may be used in wireless communications to facilitate recovery from beam failures. The term "beam failure," as used herein, may refer to a failure of a beam, poor and/or degraded channel conditions on a beam, failed transmissions on a beam, a beam having one or more parameters that do not satisfy a threshold, and/or the like. The UE may request beam failure recovery by transmitting an indication of a new beam, a new synchronization signal (SS) block or a channel state information reference signal (CSI-RS) and initiating a random access control channel (RACH) procedure. ABS may transmit a downlink assignment or an uplink grant on a physical downlink control channel (PDCCH) in response to completing the beam failure recovery. Such procedures may not achieve low latency requirements or constraints for some operating modes, such as an ultra reliable low latency communication (URLLC) operating mode or deployment.

Some aspects described herein provide techniques for configuring a MAC-CE bitmap for beam failure recovery. In some aspects, a UE 120 transmits beam failure information in a MAC-CE for beam failure recovery. MAC-CE based beam failure recovery may enable beam failure recovery enhancements, such as beam failure recovery without initiating RACH procedures. The beam failure recovery enhancements enable devices (e.g., UEs and base stations) of a wireless network to perform beam failure recovery operations more quickly and more reliably, which reduces latency and increases throughput. The beam failure recovery enhancements may enable operation in URLLC.

Moreover, in some aspects, the UE 120 may reduce the overhead in the MAC-CE consumed by the beam failure information by including the beam failure information in a bitmap included in the MAC-CE. In these cases, each bit may indicate a beam failure of one or more beams for a respective serving cell that is configured with beam failure detection capabilities (e.g., is configured to perform beam failure recovery operations with UEs in the wireless network), may indicate a beam failure of one or more beams for a respective group of serving cells that are quasi-co-located, may indicate whether a new beam is indicated in the MAC-CE for each cell in a group of serving cells for which a beam failure is indicated in the MAC-CE, and/or the like.

Figure 3:
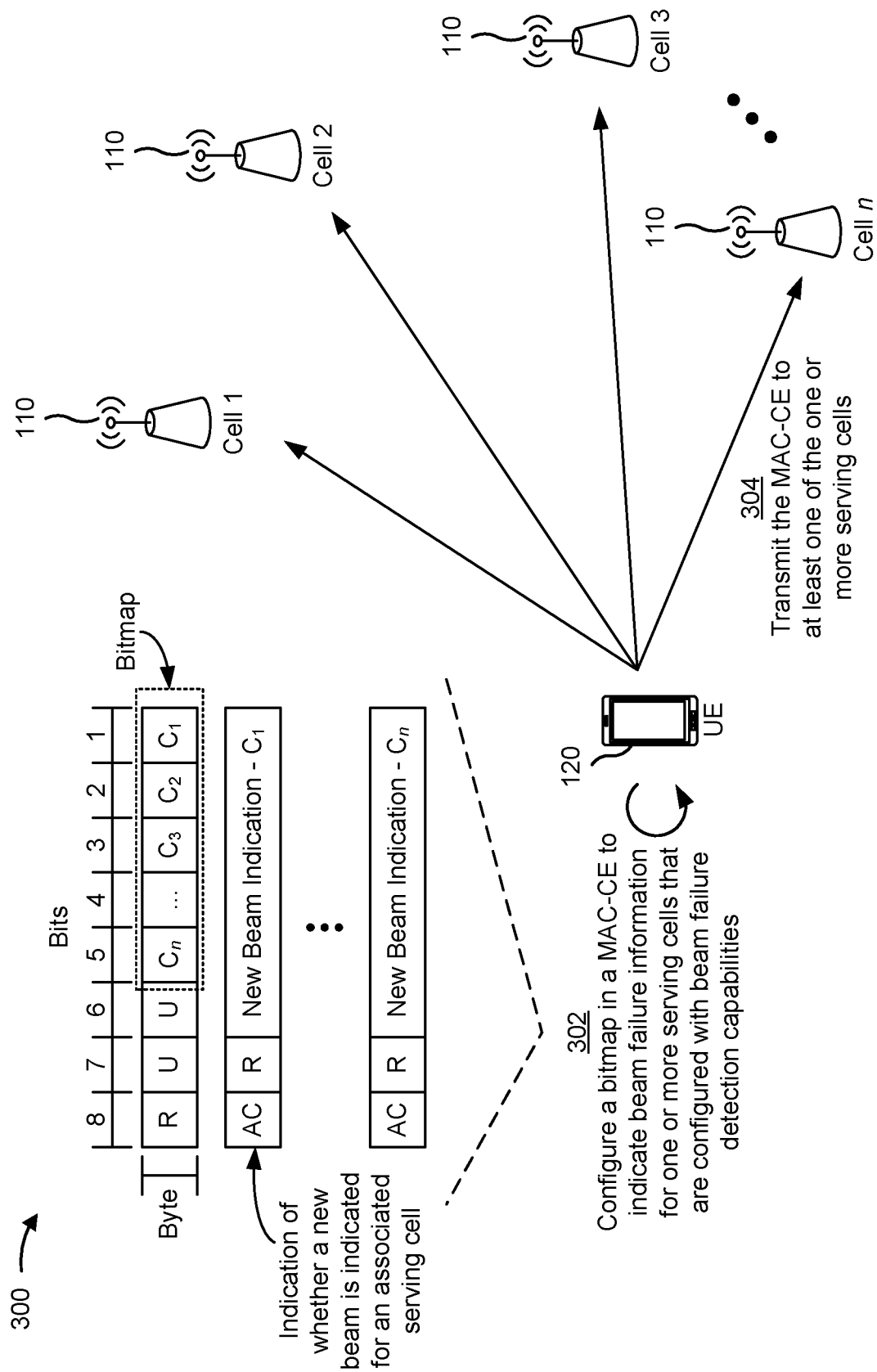

FIG. 3 is a diagram illustrating an example 300 of configuring a MAC-CE bitmap for beam failure recovery, in accordance with various aspects of the present disclosure. As shown in FIG. 3, example 300 may include a UE 120 and one or more serving cells (e.g., cell 1 through cell n) provided by one or more base stations 110. Example 300 may include greater or fewer cells than the quantity of serving cells illustrated in FIG. 3. The one or more serving cells may be serving cells of the UE 120. In some aspects, each serving cell is provided by a different base station 110. In some aspects, each serving cell is provided by the same base station 110. In some aspects, a subset of the serving cells is provided by different base stations 110 and another subset of the serving cells is provided by the same base station 110.

As shown in FIG. 3, and by reference number 302, example 300 provides an example in which the UE 120 configures a bitmap in a MAC-CE to indicate beam failure information for one or more serving cells that are configured with beam failure detection capabilities (e.g., that are configured to perform beam failure recovery operations with UEs in the wireless network). As further shown in FIG. 3, the MAC-CE may include a plurality of bytes or 8-bit octets. One byte of the MAC-CE may include the bitmap. Each bit in the bitmap may correspond to a serving cell of the one or more serving cells. Moreover, each bit in the bitmap may indicate whether a beam failure has occurred for an associated serving cell of the one or more serving cells. For example, a first bit in the bitmap may indicate whether a beam failure has occurred for cell 1 (e.g., bit $C_1$), a second bit in the bitmap may indicate whether a beam failure has occurred for cell 2 (e.g., bit $C_2$), and so on.

The value indicated by a bit in the bitmap may indicate whether an associated serving cell has experienced a beam failure. For example, a 1-value may indicate a beam failure for an associated serving cell, and a 0-value may indicate no beam failure for an associated serving cell. As another example, a 0-value may indicate a beam failure for an associated serving cell and a 1-value may indicate no beam failure for an associated serving cell.

In some aspects, the byte that includes the bitmap also includes one or more reserved bits (indicated in FIG. 3 by "R") and/or one or more unused bits (indicated in FIG. 3 by "U"). The reserved bits may be bits that are reserved for other purposes or for future use. The unused bits may be used to expand the size of the bitmap to indicate beam failures for different quantities of serving cells.

The MAC-CE may include additional bytes to indicate new beam information for the one or more serving cells. Each additional byte may be associated with a respective serving cell of the one or more serving cells. Each additional byte may include an "AC" field of one or more bits. The value indicated by the AC field may indicate whether a new beam is indicated for the serving cell associated with the additional byte. For example, a 1-value for the AC field in the byte associated with cell 1 (e.g., $C_1$) may indicate that the byte includes a new beam indication in another field for cell 1, and a 0-value for the AC field in the byte associated with cell 1 may indicate that the byte does not include a new beam indication for cell 1. As another example, a 0-value for the AC field in the byte associated with cell 1 (e.g., $C_1$) may indicate that the byte includes a new beam indication in another field for cell 1, and a 1-value for the AC field in the byte associated with cell 1 may indicate that the byte does not include a new beam indication for cell 1. In this way, if the value indicated by an AC field for a byte indicates that the byte does not include a new beam indication, a base station 110 can stop reading the byte after reading the AC field, which conserves processing and memory resources and reduces latency in processing the MAC-CE. Each additional byte may also include one or more reserved bits.

As further shown in FIG. 3, and by reference number 304, the UE 120 may transmit the MAC-CE to at least one of the one or more serving cells after configuring the bitmap in the MAC-CE. For example, the UE 120 may transmit the MAC-CE to one serving cell (e.g., cell 1). As another example, the UE 120 may transmit the MAC-CE to a subset of the one or more serving cells (e.g., to the serving cells that are indicated in the MAC-CE as having a beam failure). In some aspects, the UE 120 may transmit the MAC-CE to each of the one or more serving cells.

A base station 110, associated with a serving cell of the one or more serving cells, may receive the MAC-CE and may perform one or more BFR operations based at least in part on the beam failure information included in the MAC-CE. For example, the base station 110 may configure and/or activate a new beam indicated in the MAC-CE, may transmit a downlink transmission on a new beam indicated in the MAC-CE, and/or the like.

In this way, the UE 120 may reduce the overhead in the MAC-CE consumed by the beam failure information by including the beam failure information in a bitmap included in the MAC-CE. In these cases, each bit may indicate a beam failure of one or more beams for a respective serving cell that is configured with beam failure detection capabilities.

As indicated above, FIG. 3 is provided as an example. Other examples may differ from what is described with respect to FIG. 3.

FIGS. 4A-4E are diagrams illustrating one or more examples 400 of configuring a MAC-CE bitmap for beam failure recovery, in accordance with various aspects of the present disclosure. As shown in FIGS. 4A-4E, example(s) 400 may include a UE 120 and a plurality of serving cells (e.g., cell 1 through cell m) provided by one or more base stations 110. Example(s) 400 may include greater or fewer cells than the quantity of serving cells illustrated in FIGS. 4A-4E. The plurality of serving cells may be serving cells of the UE 120. In some aspects, each serving cell is provided by a different base station 110. In some aspects, each serving cell is provided by the same base station 110. In some aspects, a subset of the serving cells is provided by different base stations 110 and another subset of the serving cells is provided by the same base station 110.

Figure 4A:
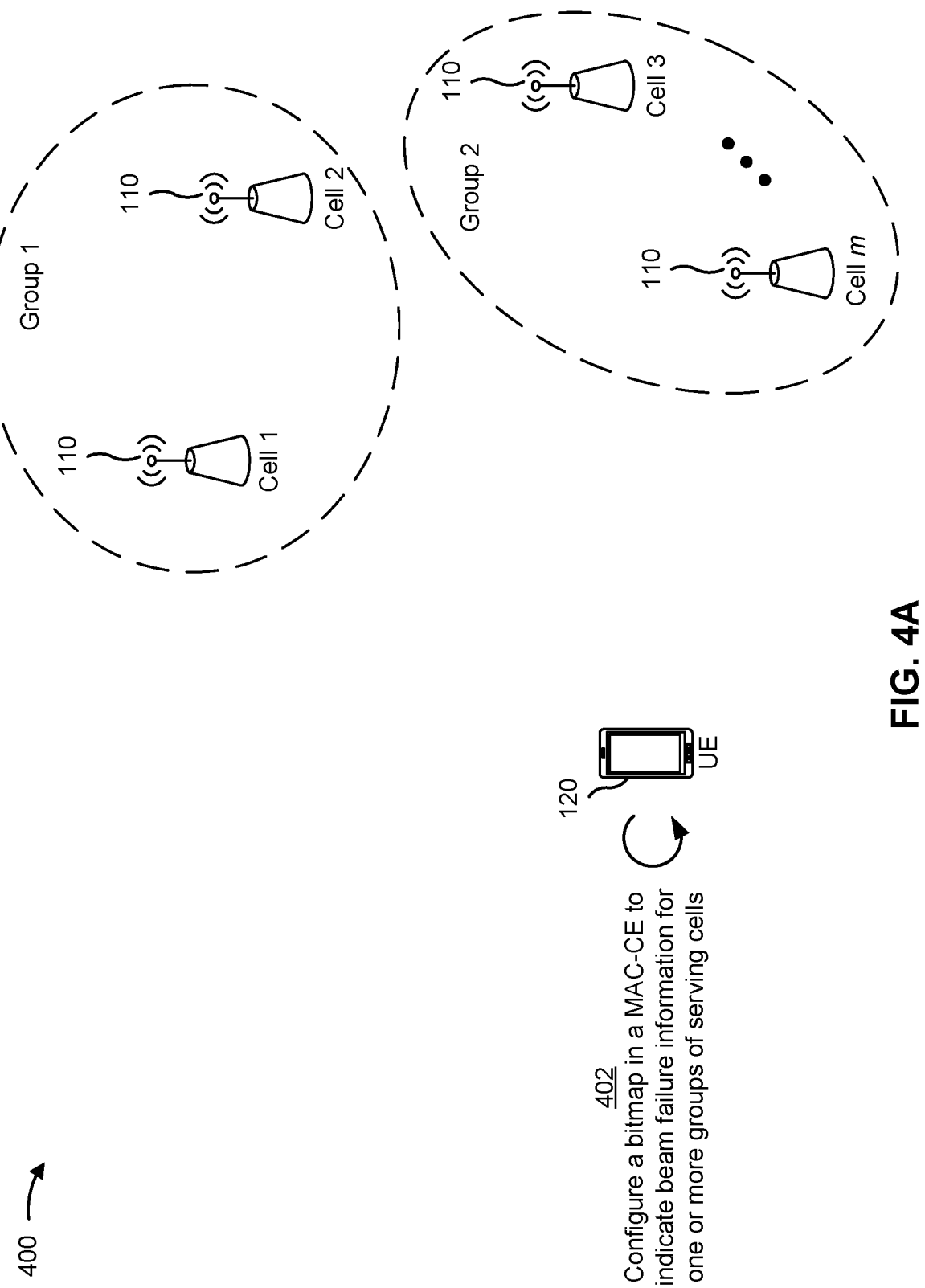

As shown in FIG. 4A, the plurality of serving cells may be distributed across a plurality of cell groups. For example, and as illustrated in FIG. 4A, cell 1 and cell 2 may be included in cell group 1, and cell 3 and cell m may be included in group 2. Other combinations and quantities of groups may be configured and/or deployed in example(s) 400. In some aspects, the serving cells included in a cell group may be quasi-co-located. In some aspects, a first serving cell and a second cell are quasi-co-located if properties of the channel over the first serving cell communicates can be inferred from the properties of the channel over which the second serving cell communicated, and/or vice-versa.

Figure 4B:
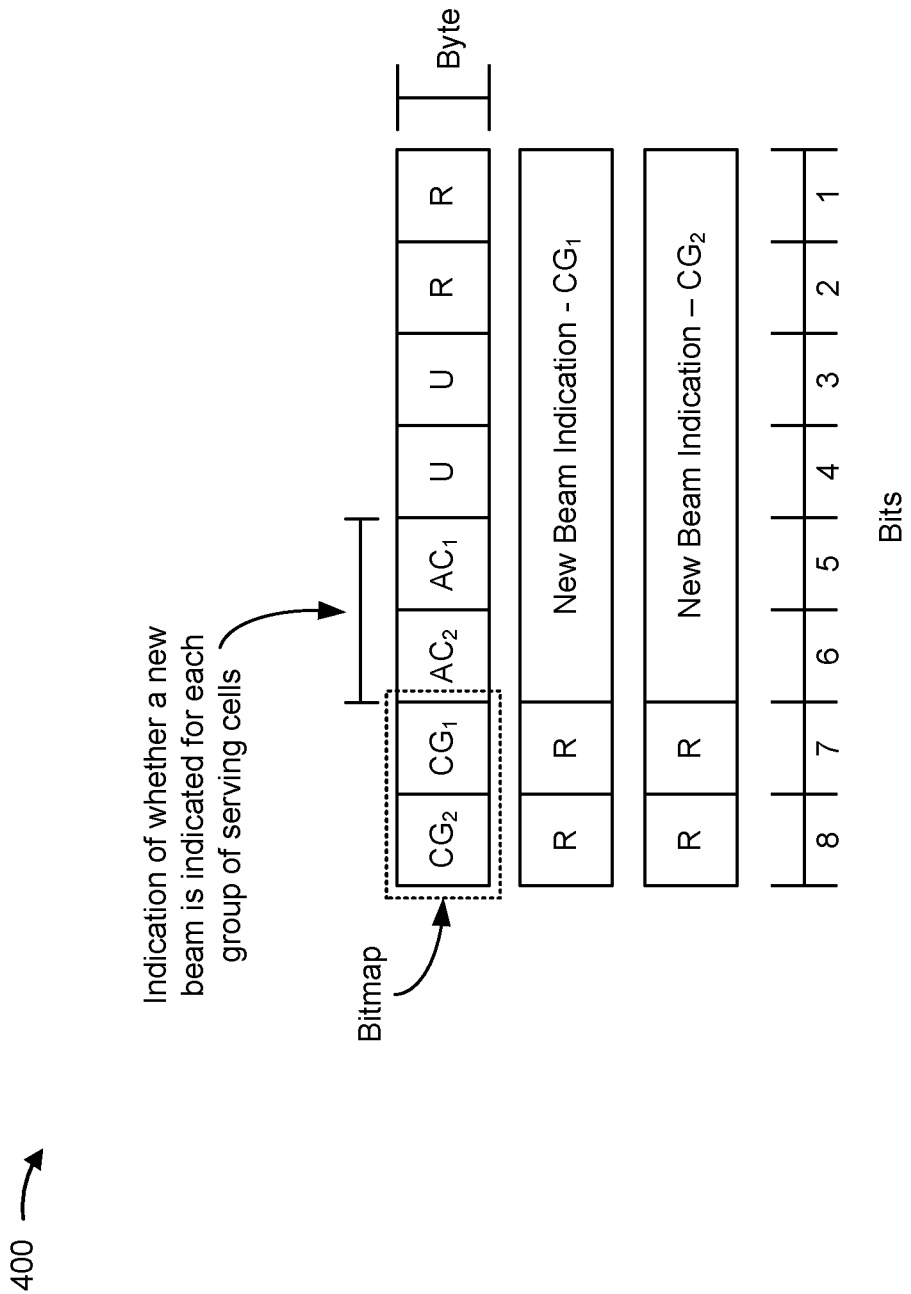
Figure 4C:
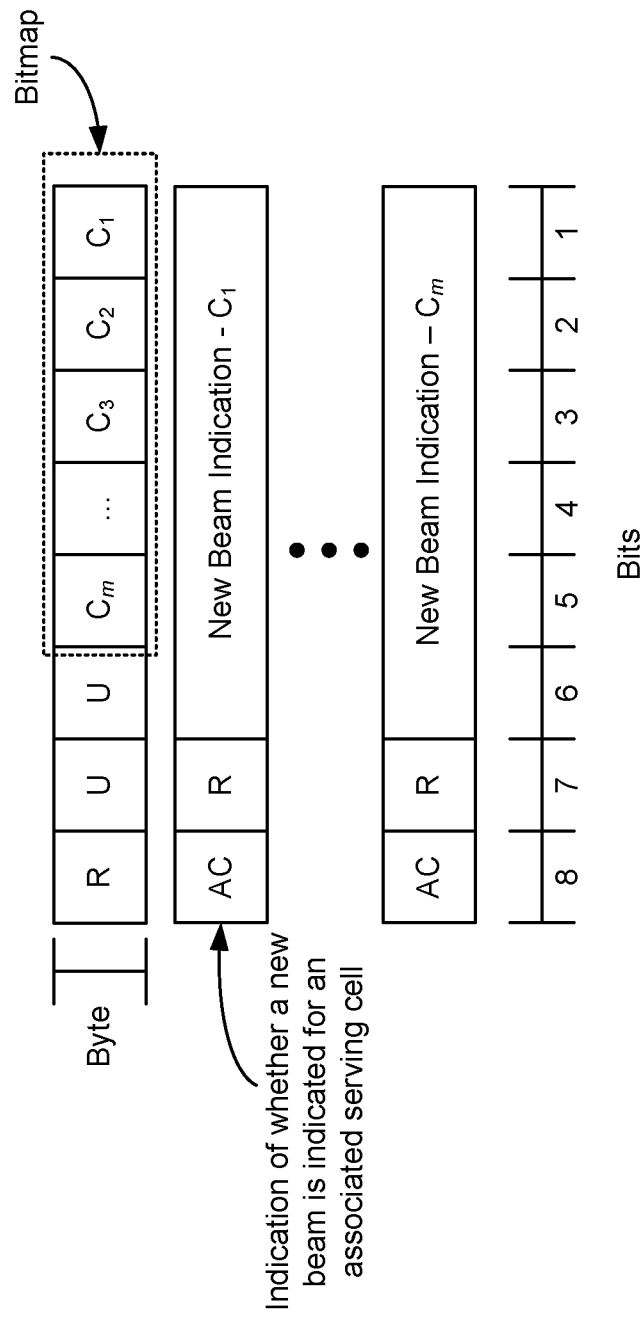

As further shown in FIG. 4A, and by reference number 402, example 400 provides an example in which the UE 120 configures a bitmap in a MAC-CE to indicate beam failure information for one or more groups of serving cells that are quasi-co-located. FIGS. 4B-4D illustrate various example techniques for configuring a bitmap in a MAC-CE to indicate beam failure information for one or more groups of serving cells that are quasi-co-located. Other configurations may be used.

As shown in FIG. 4B, in some examples, the MAC-CE may include a plurality of bytes or 8-bit octets. One byte of the MAC-CE may include the bitmap. Each bit in the bitmap may correspond to a group of serving cells of the one or more groups of serving cells. Moreover, each bit in the bitmap may indicate whether a beam failure has occurred for an associated group of serving cells of the one or more groups of serving cells. For example, a first bit in the bitmap may indicate whether a beam failure has occurred for cell group 1 (e.g., bit $CG_1$), a second bit in the bitmap may indicate whether a beam failure has occurred for cell group 2 (e.g., bit $CG_2$), and so on.

The value indicated by a bit in the bitmap may indicate whether an associated group of serving cells has experienced a beam failure. For example, a 1-value may indicate a beam failure for an associated serving cell, and a 0-value may indicate no beam failure for an associated serving cell. As another example, a 0-value may indicate a beam failure for an associated serving cell and a 1-value may indicate no beam failure for an associated serving cell. In some aspects, the UE 120 determines that a beam failure has occurred for a group of serving cells based at least in part on detecting a beam failure on a beam of a serving cell included in the group of serving cells. Since the serving cells in the group of serving cells are quasi-co-located and communicate using the same beam(s), if a beam for one of the serving cell fails, the UE 120 may determine that the beam has failed for all serving cells in the group of serving cells.

The MAC-CE may include additional bytes to indicate new beam information for the groups of serving cells. Each additional byte may be associated with a respective group of serving cells. The byte that includes the bitmap may include one or more bits for respective "AC" fields associated with each of the groups of serving cells. The value indicated by an AC field associated with a group of serving cells may be indicate whether the additional byte, associated with the group of serving cells, includes a new beam indication for the group of serving cells. For example, a 1-value for the AC field associated with cell group 1 (e.g., $CG_1$) may indicate that the byte associated with cell group 1 includes a new beam indication in a field in the byte, and a 0-value for the AC field may indicate that the byte associated with cell group 1 does not include a new beam indication for cell group 1. As another example, a 0-value for the AC field associated with cell group 1 (e.g., $CG_1$) may indicate that the byte associated with cell group 1 includes a new beam indication in a field in the byte, and a 1-value for the AC field may indicate that the byte associated with cell group 1 does not include a new beam indication for cell group 1. In this way, if the value indicated by an AC field for a byte indicates that the byte does not include a new beam indication, a base station 110 does not need to read the byte after reading the AC field, which conserves processing and memory resources and reduces latency in processing the MAC-CE.

In some aspects, the byte that includes the bitmap also includes one or more reserved bits (indicated in FIG. 4B by "R") and/or one or more unused bits (indicated in FIG. 4B by "U"). The reserved bits may be bits that are reserved for other purposes or for future use. The unused bits may be used to expand the size of the bitmap to indicate beam failures for different quantities of serving cells. In some aspects, each additional byte for indicating new beam information may include one or more reserved bits.

As shown in FIG. 4C, in some examples, the MAC-CE may include a plurality of bytes or 8-bit octets. One byte of the MAC-CE may include the bitmap. Each bit in the bitmap may correspond to a respective serving cell of the plurality of serving cells (e.g., bit $C_1$ through $C_m$). In these cases, the UE 120 may detect or determine a beam failure for a group of serving cells, and may use the bitmap to individually indicate the beam failure for the serving cells included in the group of serving cells. For example, the UE 120 may configure the values of the bits associated with the service cells included in the group of serving cells to indicate that the beam failure has occurred for the serving cells. Thus, the indication that the beam failure has occurred for the serving cells in the group of serving cells is an implicit indication that the beam failure has occurred for the group of serving cells.

In some aspects, the byte that includes the bitmap also includes one or more reserved bits (indicated in FIG. 4C by "R") and/or one or more unused bits (indicated in FIG. 4C by "U"). The reserved bits may be bits that are reserved for other purposes or for future use. The unused bits may be used to expand the size of the bitmap to indicate beam failures for different quantities of serving cells.

The MAC-CE may include additional bytes to indicate new beam information for the plurality of serving cells. Each additional byte may be associated with a respective serving cell of the plurality of serving cells. Each additional byte may include an "AC" field of one or more bits. The value indicated by the AC field may be indicate whether a new beam is indicated for the serving cell associated with the additional byte. For example, a 1-value for the AC field in the byte associated with cell 1 (e.g., $C_1$) may indicate that the byte includes a new beam indication in another field for cell 1, and a 0-value for the AC field in the byte associated with cell 1 may indicate that the byte does not include a new beam indication for cell 1. As another example, a 0-value for the AC field in the byte associated with cell 1 (e.g., $C_1$) may indicate that the byte includes a new beam indication in another field for cell 1, and a 1-value for the AC field in the byte associated with cell 1 may indicate that the byte does not include a new beam indication for cell 1. In this way, if the value indicated by an AC field for a byte indicates that the byte does not include a new beam indication, a base station 110 can stop reading the byte after reading the AC field, which conserves processing and memory resources and reduces latency in processing the MAC-CE. Each additional byte may also include one or more reserved bits.

As shown in FIG. 4D, in some examples, the MAC-CE may include a plurality of bytes or 8-bit octets. One byte of the MAC-CE may include the bitmap. The byte that includes the bitmap may also include a bit (indicated in FIG. 4D by "CG") that indicates a beam failure for a group of serving cells of the one or more groups of serving cells. In these cases, the value of the CG bit may indicate the group of serving cells that has experienced a beam failure. For example, a 0-value may indicate that cell group 1 has experienced a beam failure, and a 1-value may indicate that cell group 2 has experienced a beam failure. In some aspects, the MAC-CE may include a plurality of CG bits to indicate the group of serving cells that has experienced a beam failure so as to accommodate a greater quantity of configured groups of serving cells.

Each bit in the bitmap may correspond to a respective serving cell of the group of serving cells for each the CG bit indicates a beam failure. Moreover, each bit in the bitmap may indicate whether an associated byte in the MAC-CE includes new beam information for an associated serving cell of the plurality of serving cells. For example, a first bit (e.g., bit $AG_1$) in the bitmap may indicate whether an associated byte in the MAC-CE includes new beam information for cell 1, a second bit (e.g., bit $AG_2$) in the bitmap may indicate whether an associated byte in the MAC-CE includes new beam information for cell 2, and so on. In this way, if the value indicated by an AC bit for a byte indicates that the byte does not include a new beam indication, a base station 110 does not need to read the byte after reading the AC bit, which conserves processing and memory resources and reduces latency in processing the MAC-CE.

In some aspects, the byte that includes the bitmap also includes one or more reserved bits (indicated in FIG. 4A by "R") and/or one or more unused bits (indicated in FIG. 4B by "U"). The reserved bits may be bits that are reserved for other purposes or for future use. The unused bits may be used to expand the size of the bitmap to indicate beam failures for different quantities of serving cells. In some aspects, each additional byte for indicating new beam information may include one or more reserved bits.

Figure 4E:
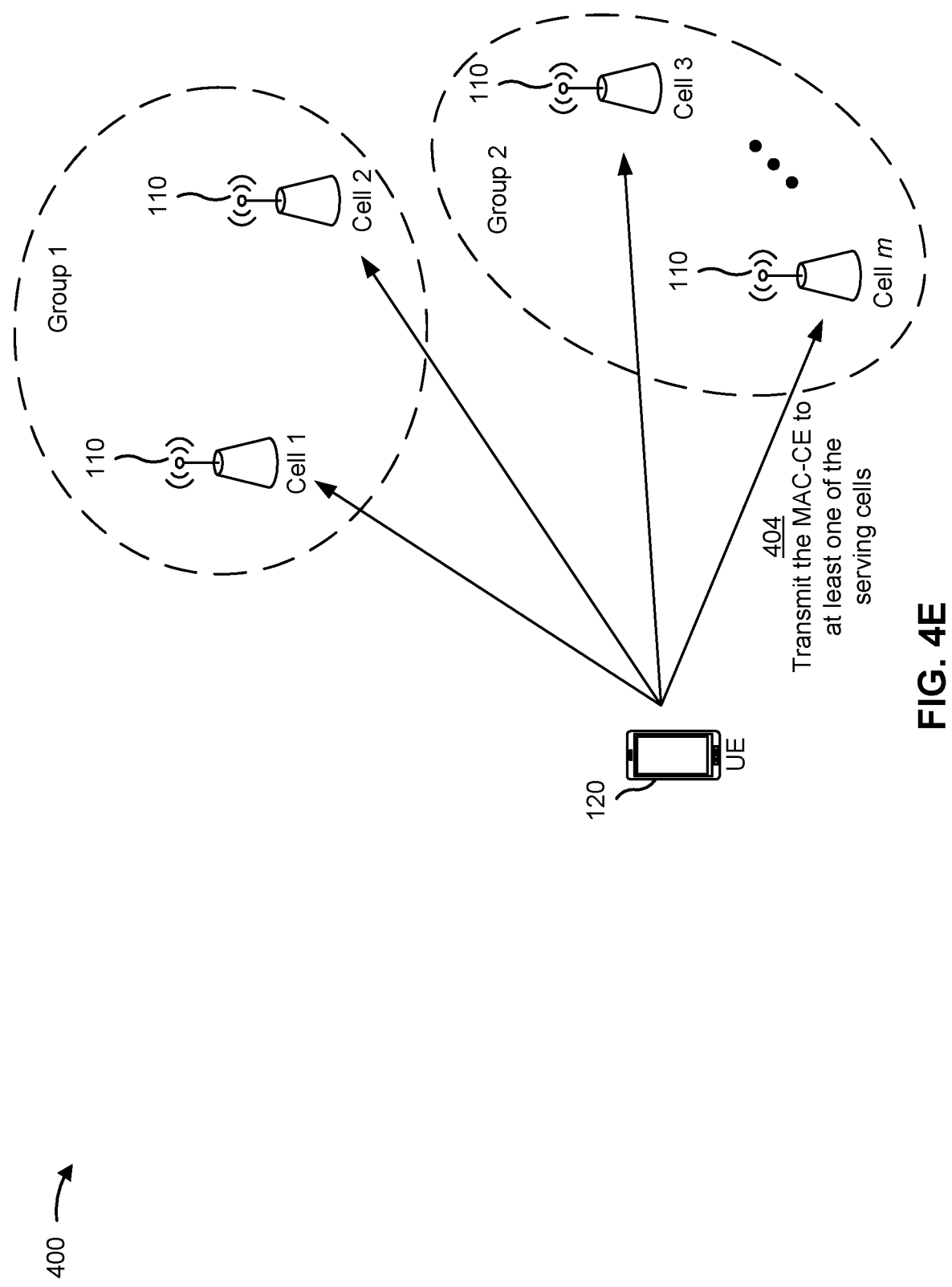

As shown in FIG. 4E, and by reference number 404, the UE 120 may transmit the MAC-CE to at least one of the one or more serving cells after configuring the bitmap in the MAC-CE. In some aspects, the UE 120 transmits the MAC-CE to one serving cell in each cell group (e.g., cell 1 in cell group 1 and cell 3 in cell group 3). For example, the UE 120 may transmit the MAC-CE to the serving cell in each cell group that is configured with beam failure detection capabilities. As another example, the UE 120 may transmit the MAC-CE to each serving cell included in each cell group.

A base station 110, associated with a serving cell of the one or more serving cells, may receive the MAC-CE and may perform one or more BFR operations based at least in part on the beam failure information included in the MAC-CE. For example, the base station 110 may configure and/or activate a new beam indicated in the MAC-CE, may transmit a downlink transmission on a new beam indicated in the MAC-CE, and/or the like.

In this way, the UE 120 may reduce the overhead in the MAC-CE consumed by the beam failure information by including the beam failure information in a bitmap included in the MAC-CE. In these cases, each bit may indicate a beam failure of one or more beams for a respective serving cell in a group of serving cells that are quasi-co-located, may indicate a beam failure of one or more beams for a respective group of serving cells that are quasi-co-located, may indicate whether a new beam is incited in the MAC-CE for each cell in a group of serving cells for which a beam failure is indicated in the MAC-CE, and/or the like.

As indicated above, FIGS. 4A-4E are provided as one or more examples. Other examples may differ from what is described with respect to FIGS. 4A-4E.

Figure 5:
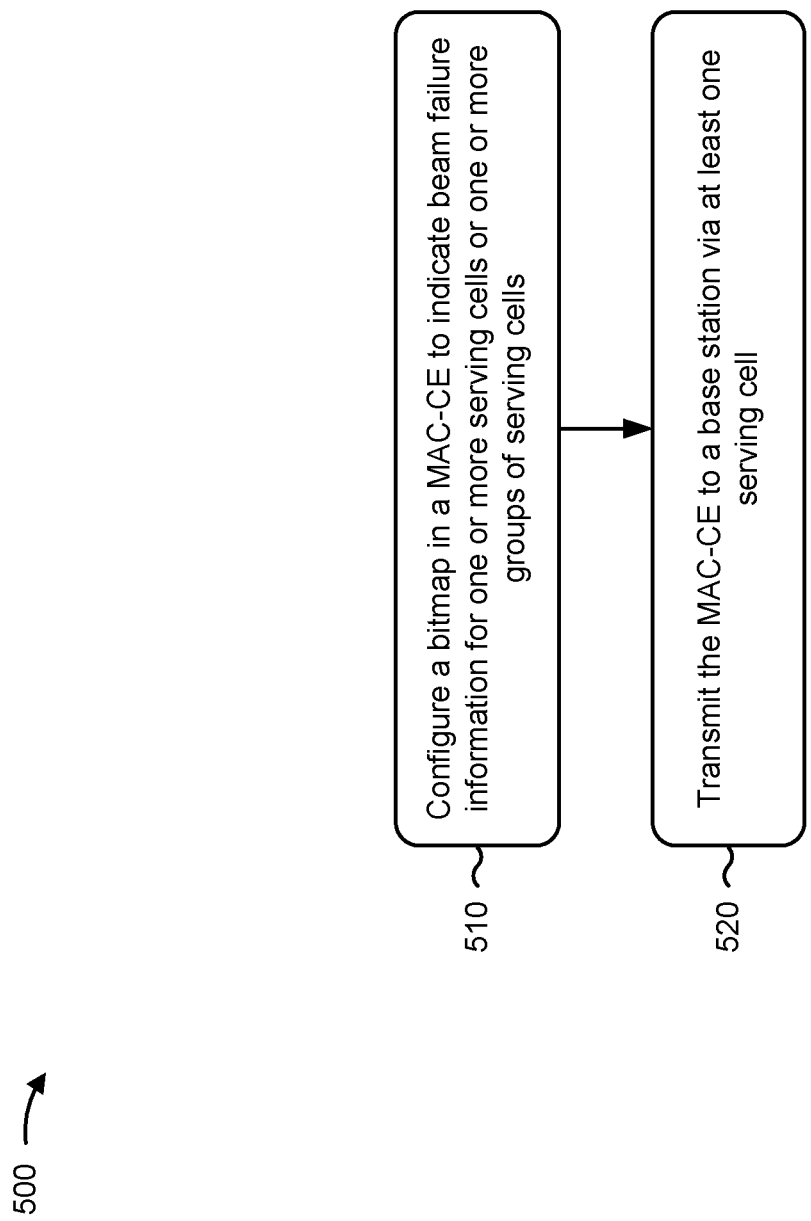
FIG. 5 is a diagram illustrating an example process performed, for example, by a UE, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120 illustrated and described above in connection with one or more of FIGS. 1, 2, 3, and/or 4A-4E) performs operations associated with configuring a MAC-CE bitmap for beam failure recovery.

As shown in FIG. 5, in some aspects, process 500 may include configuring a bitmap in a MAC-CE to indicate beam failure information for one or more serving cells or one or more groups of serving cells (block 510). For example, the UE (e.g., using receive processor 258, transmit processor 264, controller/processor 280, memory 282, and/or the like) may configure a bitmap in a MAC-CE to indicate beam failure information for one or more serving cells or one or more groups of serving cells, as described above.

As further shown in FIG. 5, in some aspects, process 500 may include transmitting the MAC-CE to a base station via at least one serving cell (block 520). For example, the UE (e.g., using receive processor 258, transmit processor 264, controller/processor 280, memory 282, and/or the like) may transmit the MAC-CE to a base station via at least one serving cell, as described above.

Process 500 may include additional aspects, such as any single aspect or any combination of aspects described below and/or in connection with one or more other processes described elsewhere herein.

In a first aspect, configuring the bitmap comprises configuring each bit, of at least a subset of bits included in the bitmap, to indicate whether a beam failure of one or more beams has occurred for an associated serving cell of the one or more serving cells, and the one or more serving cells are configured with beam failure detection capabilities. In a second aspect, alone or in combination with the first aspect, another subset of the bitmap includes one or more unused bits. In a third aspect, alone or in combination with one or more of the first and second aspects, the bitmap is included along with one or more reserved bits in a byte in the MAC-CE. In a fourth aspect, alone or in combination with one or more of the first through third aspects, process 500 includes configuring, in the MAC-CE, one or more bytes associated with the one or more serving cells, wherein a byte, of the one or more bytes, is associated with a serving cell of the one or more serving cells includes a first field is indicating whether the byte includes an indication of a new beam for the serving cell and a second field is including the indication of the new beam.

In a fifth aspect, alone or in combination with one or more of the first through fourth aspects, configuring the bitmap comprises configuring each bit, of at least a subset of bits included in the bitmap, to indicate whether a beam failure of one or more beams has occurred for at least a subset of the one or more groups of serving cells, where serving cells within each group are quasi-co-located. In a sixth aspect, alone or in combination with one or more of the first through fifth aspects, another subset of the bitmap includes one or more unused bits. In a seventh aspect, alone or in combination with one or more of the first through sixth aspects, the bitmap is included along with one or more reserved bits in a byte in the MAC-CE. In an eighth aspect, alone or in combination with one or more of the first through seventh aspects, the bitmap is included along with one or more new beam indicator bits in a byte in the MAC-CE, and each of the one or more new beam indicator bits indicates whether an associated byte in the MAC-CE includes an indication of a new beam for an associated group of serving cells.

In a ninth aspect, alone or in combination with one or more of the first through eighth aspects, configuring the bitmap includes configuring each bit, of at least a subset of bits included in the bitmap, to indicate that a beam failure of one or more beams has occurred for a respective serving cell of a group of serving cells of the one or more groups of serving cells, wherein serving cells within each group are quasi-co-located. In a tenth aspect, alone or in combination with one or more of the first through ninth aspects, process 500 includes configuring each of one or more bytes in the MAC-CE to indicate a same new beam for an associated serving cell of the group of serving cells. In an eleventh aspect, alone or in combination with one or more of the first through tenth aspects, the bitmap is included in a byte with one or more other bits that indicate the beam failure for a group of serving cells of the one or more groups of serving cells, each bit in the bitmap indicates whether a new beam is indicated for an associated serving cell in the group of serving cells, and serving cells within each group are quasi-co-located.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
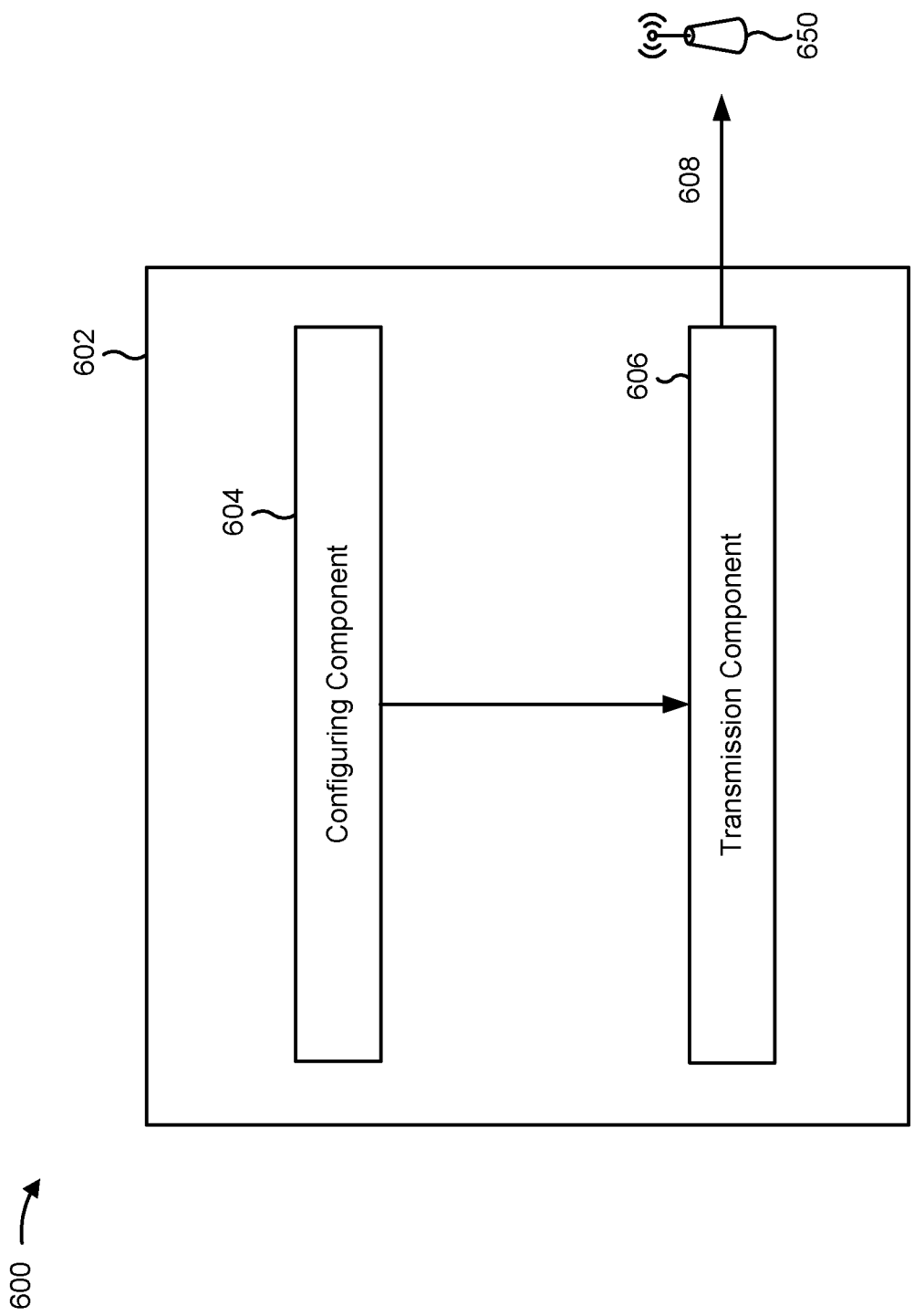
FIG. 6 is a conceptual data flow diagram illustrating the data flow between different components in an example apparatus, in accordance with various aspects of the present disclosure.

FIG. 6 is a conceptual data flow diagram 600 illustrating the data flow between different components in an example apparatus 602. The apparatus 602 may be a UE (e.g., UE 120 illustrated and described above in connection with one or more of FIGS. 1, 2, 3, and/or 4A-4E). In some aspects, the apparatus 602 includes a configuring component 604, a transmission component 606.

In some aspects, the configuring component 604 configures a bitmap in a MAC-CE 608 to indicate beam failure information for one or more serving cells that are configured with beam failure detection capabilities or one or more groups of serving cells. In some aspects, the serving cells within each group are quasi-co-located. In some aspects, the one or more serving cells, or the serving cells in each group are provided by a base station 650 (e.g., base station 110 illustrated and described above in connection with one or more of FIGS. 1, 2, 3, and/or 4A-4E). In some aspects, the transmission component 606 transmits the MAC-CE 608 to at least one serving cell.

In some aspects, the configuring component 604 includes a receive processor (e.g., receive processor 258), a transmit processor (e.g., transmit processor 264), a controller/processor (e.g., controller/processor 280), a memory (e.g., memory 282), and/or the like. In some aspects, the transmission component 606 includes an antenna 252, a MOD 254, a transmit processor (e.g., transmit processor 264), a TX MIMO processor (e.g., TX MIMO processor 266, a controller/processor (e.g., controller/processor 280), a memory (e.g., memory 282), and/or the like.

The apparatus 602 may include additional components that perform each of the blocks of the algorithm in the aforementioned process 500 of FIG. 5 and/or the like. Each block in the aforementioned process 500 of FIG. 5 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    generating a bitmap in a medium access control control element (MAC-CE) to indicate beam failure recovery information for:
        one or more serving cells;
    generating, in the MAC-CE, one or more bytes associated with the one or more serving cells, wherein a byte, of the one or more bytes, includes:
        a first field indicating whether the byte includes an indication of a new beam for at least one serving cell of the one or more serving cells, and
        a second field including the indication of the new beam for the at least one serving cell; and
    transmitting the MAC-CE to a base station via at least one serving cell.

2. The method of claim 1, wherein configuring the bitmap comprises:
    generating each bit, of at least a subset of bits included in the bitmap, to indicate whether a beam failure of one or more beams has occurred for an associated serving cell of the one or more serving cells.

3. The method of claim 1, wherein the one or more serving cells are arranged in an ascending order in the bitmap.

4. The method of claim 1, wherein the one or more serving cells are arranged in an ascending order in the one or more bytes.

5. The method of claim 1, wherein configuring the bitmap comprises:
    configuring each bit, of at least a subset of bits included in the bitmap, to indicate whether a beam failure of one or more beams has occurred for at least a subset of the one or more serving cells,
    wherein serving cells are quasi-co-located.

6. The method of claim 5, wherein another subset of the bitmap includes one or more unused bits.

7. The method of claim 5, wherein the bitmap is included along with one or more reserved bits in a byte in the MAC-CE.

8. The method of claim 5, wherein the bitmap is included along with one or more new beam indicator bits in a byte in the MAC-CE; and
    wherein each of the one or more new beam indicator bits indicates whether an associated byte in the MAC-CE includes an indication of a new beam for an associated group of serving cells.

9. The method of claim 1, wherein configuring the bitmap comprises:
    configuring each bit, of at least a subset of bits included in the bitmap, to indicate that a beam failure of one or more beams has occurred for a respective serving cell of a group of serving cells of the one or more groups of serving cells,
    wherein serving cells within each group are quasi-co-located.

10. The method of claim 9, further comprising:
    configuring each of one or more bytes in the MAC-CE to indicate a same new beam for an associated serving cell of the group of serving cells.

11. The method of claim 1, wherein the bitmap is included in a byte with one or more other bits that indicate the beam failure for a group of serving cells of the one or more groups of serving cells;
    wherein each bit in the bitmap indicates whether a new beam is indicated for an associated serving cell in the group of serving cells; and
    wherein serving cells within each group are quasi-co-located.

12. A user equipment (UE) for wireless communication, comprising:
    one or more memories; and
    one or more processors coupled to the one or more memories, and configured to:
        generate a bitmap in a medium access control control element (MAC-CE) to indicate beam failure recovery information for:
            one or more serving cells;
        generate, in the MAC-CE, one or more bytes associated with the one or more serving cells, wherein a byte, of the one or more bytes, includes:
            a first field indicating whether the byte includes an indication of a new beam for at least one serving cell of the one or more serving cells, and a second field including the indication of the new beam for the at least one serving cell; and transmit the MAC-CE to a base station via at least one serving cell.

13. The UE of claim 12, wherein the one or more processors, to generate the bitmap, are configured to:
generate each bit, of at least a subset of bits included in the bitmap, to indicate whether a beam failure of one or more beams has occurred for an associated serving cell of the one or more serving cells.

14. The UE of claim 12, wherein the one or more serving cells are arranged in an ascending order in the bitmap.

15. The UE of claim 12,
wherein the one or more serving cells are arranged in an ascending order in the one or more bytes.

16. The UE of claim 12, wherein the one or more processors, when configuring the bitmap, are configured to:
configure each bit, of at least a subset of bits included in the bitmap, to indicate whether a beam failure of one or more beams has occurred for at least a subset of the one or more serving cells,
wherein serving cells are quasi-co-located.

17. The UE of claim 16, wherein another subset of the bitmap includes one or more unused bits.

18. The UE of claim 16, wherein the bitmap is included along with one or more reserved bits in a byte in the MAC-CE.

19. The UE of claim 16, wherein the bitmap is included along with one or more new beam indicator bits in a byte in the MAC-CE; and
wherein each of the one or more new beam indicator bits indicates whether an associated byte in the MAC-CE includes an indication of a new beam for an associated group of serving cells.

20. The UE of claim 12, wherein the one or more processors, when configuring the bitmap, are configured to:
configure each bit, of at least a subset of bits included in the bitmap, to indicate that a beam failure of one or more beams has occurred for a respective serving cell of a group of serving cells of the one or more groups of serving cells,
wherein serving cells within each group are quasi-co-located.

21. The UE of claim 20, wherein the one or more processors are further configured to:
configure each of one or more bytes in the MAC-CE to indicate a same new beam for an associated serving cell of the group of serving cells.

22. The UE of claim 12, wherein the bitmap is included in a byte with one or more other bits that indicate the beam failure for a group of serving cells of the one or more groups of serving cells; and
wherein each bit in the bitmap indicates whether a new beam is indicated for an associated serving cell in the group of serving cells; and
wherein serving cells within each group are quasi-co-located.

23. A non-transitory computer-readable medium storing one or more instructions for wireless communication, the one or more instructions comprising:
one or more instructions that, when executed by one or more processors of a user equipment (UE), cause the one or more processors to:
generate a bitmap in a medium access control control element (MAC-CE) to indicate beam failure recovery information for:
one or more serving cells;

generate, in the MAC-CE, one or more bytes associated with the one or more serving cells, wherein a byte, of the one or more bytes, includes:
a first field indicating whether the byte includes an indication of a new beam for at least one serving cell of the one or more serving cells, and
a second field including the indication of the new beam for the at least one serving cell; and
transmit the MAC-CE to a base station via at least one serving cell.

24. The non-transitory computer-readable medium of claim 23, wherein the one or more instructions, that cause the one or more processors to generate the bitmap, cause the one or more processors to:
generate each bit, of at least a subset of bits included in the bitmap, to indicate whether a beam failure of one or more beams has occurred for an associated serving cell of the one or more serving cells.

25. The non-transitory computer-readable medium of claim 23, wherein the one or more serving cells are arranged in an ascending order in the bitmap.

26. The non-transitory computer-readable medium of claim 25, wherein the one or more serving cells are arranged in an ascending order in the one or more bytes.

27. An apparatus for wireless communication, comprising:
means for generating a bitmap in a medium access control control element (MAC-CE) to indicate beam failure recovery information for:
one or more serving cells, or
one or more groups of serving cells;
means for generating, in the MAC-CE, one or more bytes associated with the one or more serving cells, wherein a byte, of the one or more bytes, includes:
a first field indicating whether the byte includes an indication of a new beam for at least one serving cell of the one or more serving cells, and
a second field including the indication of the new beam for the at least one serving cell; and
means for transmitting the MAC-CE to a base station via at least one serving cell.

28. The apparatus of claim 27, wherein the means for generating the bitmap comprises:
means for generating each bit, of at least a subset of bits included in the bitmap, to indicate whether a beam failure of one or more beams has occurred for an associated serving cell of the one or more serving cells.

29. The apparatus of claim 27, wherein the one or more serving cells are arranged in an ascending order in the bitmap.

30. The apparatus of claim 27, wherein the one or more serving cells are arranged in an ascending order in the one or more bytes.

31. The method of claim 1, wherein the byte comprises a set of bits, wherein each bit of the set of bits corresponds to a serving cell of the one or more serving cells, wherein each bit either indicates new beam information for the serving cell or is a reserved bit.

32. The UE of claim 12, wherein the byte comprises a set of bits, wherein each bit of the set of bits corresponds to a serving cell of the one or more serving cells, wherein each bit either indicates new beam information for the serving cell or is a reserved bit.

33. The non-transitory computer-readable medium of claim 23, wherein the byte comprises a set of bits, wherein each bit of the set of bits corresponds to a serving cell of the one or more serving cells, wherein each bit either indicates new beam information for the serving cell or is a reserved bit.

34. The apparatus of claim 27, wherein the byte comprises a set of bits, wherein each bit of the set of bits corresponds to a serving cell of the one or more serving cells, wherein each bit either indicates new beam information for the serving cell or is a reserved bit.

* * * * *